P. TESLUK.
TRACTION APPLIANCE.
APPLICATION FILED JAN. 25, 1918.

1,286,836.

Patented Dec. 3, 1918.

Inventor
P Tesluk
By Lacey & Lacey, Attorneys

UNITED STATES PATENT OFFICE.

PAMPHIL TESLUK, OF NEW YORK, N. Y.

TRACTION APPLIANCE.

1,286,836.  Specification of Letters Patent.  Patented Dec. 3, 1918.

Application filed January 25, 1918.  Serial No. 213,745.

*To all whom it may concern:*

Be it known that I, PAMPHIL TESLUK, a citizen of the United States, residing at New York, in the county of New York and State of New York, have invented certain new and useful Improvements in Traction Appliances, of which the following is a specification.

This invention relates to traction appliances for the wheels of automobiles and similar vehicles. Considering the difficulty which is frequently experienced in driving an automobile over muddy roads and the labor and expense involved in pulling a car out of a rut or ditch after its wheels have sunk to a considerable depth in the mud, the present invention aims to provide a traction device which may be readily applied to the front and rear wheels at each side of the automobile and which will enable the car to be driven over muddy roads without likelihood of such an accident occurring. Briefly stated, the appliance embodying the present invention somewhat resembles in its general construction the well-known caterpillar drive employed upon traction engines. However, the device of the invention differs in many respects from the well-known caterpillar drive or traction appliance, which differences especially adapt it for use in connection with the tired wheels of automobiles and similar vehicles. It is one aim of the present invention, for example, to provide an appliance for the purpose stated which will in no way chafe or otherwise injure the tire casings of the wheels, which will be relatively light in weight and very flexible so as to readily conform to irregularities in the road surface, and which will not in any way interfere with steering of the automobile.

Another object of the invention is to provide a device for the purpose stated which may be readily applied to and removed from the wheels of an automobile so as to permit of its being brought into use wherever required and without necessitating its use at all times.

The appliance embodying the invention consists, briefly stated, of an endless series of tread blocks linked together in such manner as to permit of their ready passage about the front and rear wheels to which the appliance is fitted, and it is an aim of the present invention to so construct the connected ends of these blocks that one end of each block in the series will mutually overlap the connected end of the next adjacent block in the series so that the pivotal connections between the blocks will not be subjected to any great amount of strain and the appliance as a whole will present, to the road surface, a substantially unbroken tread. Furthermore, by forming the blocks with mutually overlapping end portions, I contemplate preventing the accumulation of mud, stones, or the like between the ends of the blocks as well as strengthening the connections between the blocks.

In the accompanying drawings:

Figure 1 is a side elevation of the appliance applied to the front and rear wheels of an automobile or the like;

Figure 1:
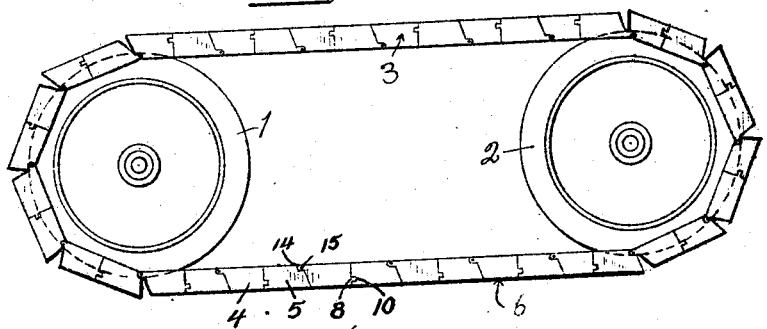

In the drawings the numerals 1 and 2 indicate respectively the front and rear wheels of an automobile or similar vehicle and while the invention is designed primarily for application to automobile wheels having pneumatic or solid rubber tires, it will be understood that the invention may also be employed upon metal tired wheels and upon the wheels of various other types of vehicles. It will be understood, of course, that one of the appliances embodying the invention will be fitted to the front and rear wheels at the right hand side of the automobile or the like and another one of the appliances will be fitted to the wheels at the other side of the automobile, and as the appliances are independent of one another, there will be no interference with the proper functioning of the differential drive of the machine.

Figure 2:
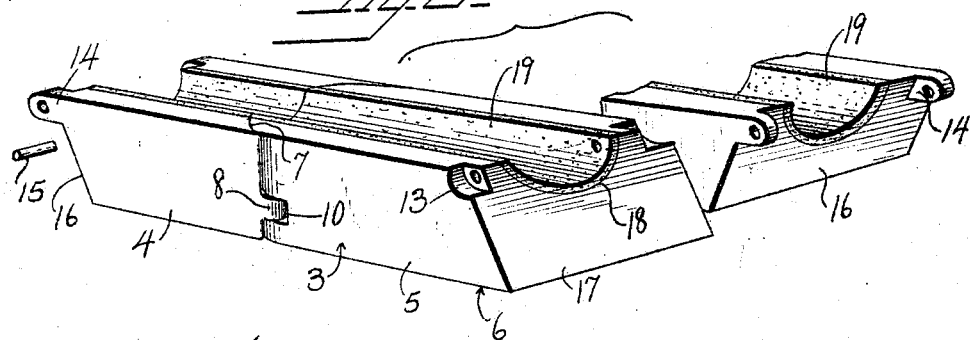
Fig. 2 is a perspective view illustrating two of the tread blocks mutually disconnected.
Figure 3:
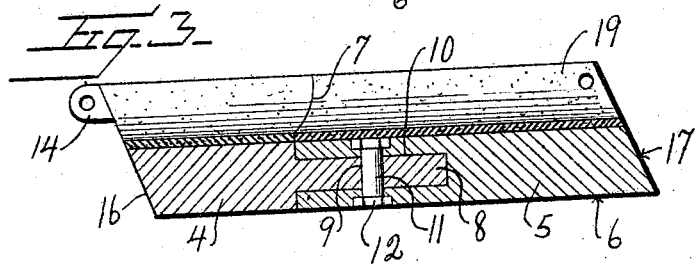
Fig. 3 is a vertical longitudinal sectional view through one of the blocks and one end portion of another of the blocks.
Figure 4:
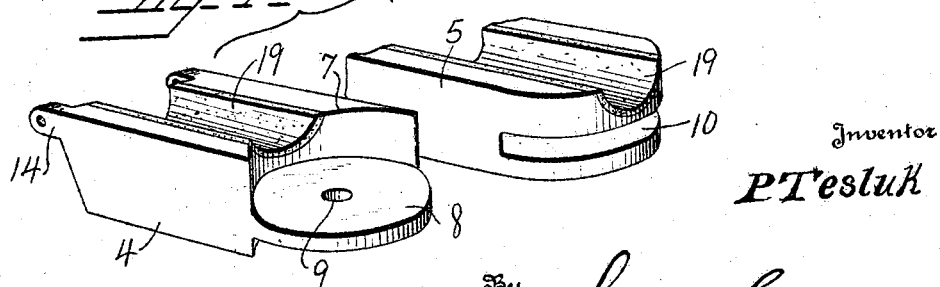
Fig. 4 is a perspective view illustrating the two sections of one of the blocks mutually separated.

The appliance embodying the present invention consists of a number of tread blocks which are linked together in an endless series, the device thus formed being disposed in the manner of a belt or chain trained about the wheels 1 and 2. The construction of these tread blocks is very clearly shown in Figs. 2, 3 and 4 of the drawings, the blocks being indicated in general by the numeral 3. Each block comprises two sections one of which is indicated by the numeral 4 and the other by the numeral 5. As a whole, each block in general form, has the shape of a parallelogram, the end faces of the block being inclined with relation to the planes of the upper and under faces. The under face of the block, indicated by the numeral 6 and comprising, of course, the under faces of the sections 4 and 5, constitutes the tread surface of the block, or in other words the surface which engages the road surface in the use of the appliance. As will be presently explained, the blocks are designed to be connected pivotally to one another throughout the entire series, the blocks being disposed end to end, and each block is formed in the sections 4 and 5 above mentioned, in order to provide for relative pivotal movement of these sections in a direction at right angles to the direction in which the adjacent blocks may have relative movement, this being done to permit of use of the appliance without interfering with the proper steering of the vehicle. In thus pivotally connecting or swiveling the two sections 4 and 5, the section 4 is formed with a transversely extending recess 7, the wall of which is arcuate and the said wall of the recess is formed, adjacent to the tread surface of the section 4, with a longitudinally extending ear 8 which, preferably extends substantially the entire width of the recessed end of the section 4, which has flat upper and under sides, and which has its outer edge extending on the arc of a circle and forming a continuation of the arc described by the wall of the recess 7. Centrally and concentric to the wall of the recess 7 and the outer edge of the ear 8, the said ear is formed vertically with an opening 9 and the said ear is fitted into a recess 10 formed in the matching end of the section 5 of the block, a pivot pin or screw 11 being fitted through the opening 9 and through corresponding openings 12 formed in the upper and lower walls of the recess 10. From the foregoing it will be evident that in this manner the sections 4 and 5 are swiveled together at their meeting ends so that in the applied position of the device, these sections may have relative angular movement about the pivot pin 11 in a horizontal plane.

In order that the several blocks of the series may be pivotally connected together so as to provide for their relative angular movement in a direction at right angles to their movement upon their swivel connection above described, each upper and outer corner of the section 5 is formed with a substantially semi-cylindrical seat or recess 13 designed to receive a similarly formed ear or lug 14 at the corresponding upper and outer corner of the section 4 of the associated or next adjacent block in the series, pivot pins 15 being fitted through openings formed in the said ears and the inner end wall of the recesses or seats 13.

By reference to the drawings it will be observed that the wall of the recess 7 is substantially perpendicular to the planes of the upper and under faces of the block, which planes are parallel. However, the outer ends of the sections 4 and 5, while occupying parallel planes are inclined with relation to the planes occupied by the upper and under faces of the sections. The said outer end face of the section 4 is indicated by the numeral 16 and the corresponding face of the section 5 is indicated by the numeral 17. Thus when the tread blocks have been assembled in the series and any two adjacent blocks are in alinement with each other, the face 16 of the section 4 of one block will rest flat against the face 17 of the section 5 of the next adjacent block in the series and consequently the end of the section 5 of one block may be said to overlap the adjacent or connected end of the section 4 of the next adjacent block. In this manner the pivots 15 are relieved to a considerable extent of strain to which they would be subjected if the connected ends of adjacent blocks had no coacting or abutting faces. It will also be apparent that inasmuch as the end of one block will overlap the connected end of the next adjacent block and so on throughout the series, there is little if any likelihood of mud or stones entering between the connected ends of the blocks which, however, would be likely to occur if the abutting faces of the blocks occupied planes at right angles to the plane of the tread faces of the blocks.

In order to adapt the appliance to be readily fitted to the wheels of an automobile and to effectually provide against accidental disengagement of the appliance from the wheels during travel of the machine, the upper faces of the sections 4 and 5 of each block are formed with alined longitudinally extending concavities 18 conforming in their transverse curvature or shape to the cross-sectional shape of the tire or tire casing of the wheel about which the appliance is to pass. It is preferable that a lining 19 be provided in the recesses 18, which lining may be of leather, rubber, or any other material, which will frictionally coact with the tire casing or tire so as to obtain the full benefit of the tractive force of the rear or driven wheels of the vehicle.

Having thus described the invention, what is claimed as new is:

1. A traction appliance for the front and rear wheels of automobiles and similar vehicles comprising an endless linked series of tread blocks, each block having its face opposite its tread face recessed to conform to the transverse contour of the tires of the wheels to which the appliance is to be fitted, and a lining of friction material arranged within the recess of each block, the recessed faces of the blocks meeting end to end throughout the series.

2. A traction appliance for the front and rear wheels of automobiles and similar vehicles comprising an endless series of tread blocks, means pivotally connecting the adjacent ends of adjacent blocks throughout the series, each block being formed in sections, a swivel connection between the sections of each block, and each of the said blocks having its face opposite its tread face recessed to conform to the transverse contour of the tires of the wheels to which the appliance is to be fitted.

3. A traction appliance for the front and rear wheels of automobiles and similar vehicles comprising an endless linked series of tread blocks, each block having the general form of a parallelogram with its ends inclined at angles to its tread face whereby one end of each block will abut against and overlap the connected end of the next adjacent block in the series.

In testimony whereof I affix my signature.

PAMPHIL TESLUK. [L. S.]